(12) United States Patent
Matei

(10) Patent No.: US 10,513,267 B2
(45) Date of Patent: Dec. 24, 2019

(54) VEHICLE SAFETY SYSTEM

(71) Applicant: TRW Limited, Solihull (GB)

(72) Inventor: Florin-Cristian Matei, Shirley (GB)

(73) Assignee: TRW Limited, Solihull, West Midlands (GB)

( * ) Notice: Subject to any disclaimer, the term of this patent is extended or adjusted under 35 U.S.C. 154(b) by 235 days.

(21) Appl. No.: 15/287,783

(22) Filed: Oct. 7, 2016

(65) Prior Publication Data
US 2017/0101102 A1    Apr. 13, 2017

(30) Foreign Application Priority Data
Oct. 7, 2015   (GB) .................................. 1517752.0

(51) Int. Cl.
| | | |
|---|---|---|
| B60W 30/00 | (2006.01) | |
| B60W 30/18 | (2012.01) | |
| G05D 1/00 | (2006.01) | |
| G05D 1/02 | (2006.01) | |
| B60W 30/095 | (2012.01) | |

(Continued)

(52) U.S. Cl.
CPC .. B60W 30/18163 (2013.01); B60W 30/0956 (2013.01); G05D 1/0055 (2013.01); G05D 1/0259 (2013.01); G08G 1/00 (2013.01); G08G 1/164 (2013.01); G08G 1/167 (2013.01); B60W 2420/52 (2013.01); B60W 2550/302 (2013.01); B60W 2550/306 (2013.01); B60W 2550/308 (2013.01); B60W 2900/00 (2013.01)

(58) Field of Classification Search
USPC ........................................................ 701/301
See application file for complete search history.

(56) References Cited

U.S. PATENT DOCUMENTS 9,014,954 B2 * 4/2015 Sato ...................... G08G 1/0112
                                                                701/118
9,126,594 B2 * 9/2015 Kawamata ............ B60W 30/09
(Continued)

FOREIGN PATENT DOCUMENTS

DE         3622447 C1    1/1988
DE       19725656 A1    1/1998
(Continued)

OTHER PUBLICATIONS

Patents Act 1977: Search Report under Section 17(5), Application No. GB1517752.0 dated Dec. 16, 2015.

*Primary Examiner* — James M McPherson
(74) *Attorney, Agent, or Firm* — MacMillan, Sobanski & Todd, LLC

(57) ABSTRACT

A safety system for a vehicle comprises a sensing means which is arranged to determine the presence of a preceding vehicle and, where present, to produce at least one first output signal representative of one or more characteristics of the preceding vehicle, the sensing means also being arranged to determine the presence of an oncoming vehicle and, where present, to produce at least one second output signal representative of one or more characteristics of the oncoming vehicle, and a controller which is arranged to receive the output signals from the sensing means, and from the signals to generate a result signal indicative that it is possible for the vehicle to safely overtake the preceding vehicle before the oncoming vehicle blocks the path along which the vehicle must travel to complete the overtaking maneuver.

8 Claims, 7 Drawing Sheets

(51) Int. Cl.
    *G08G 1/00*         (2006.01)
    *G08G 1/16*         (2006.01)

(56) References Cited

U.S. PATENT DOCUMENTS 9,493,163 B2 *   11/2016   Ezoe ................. B60W 30/14
    9,499,171 B2 *   11/2016   Nagase ............ B60W 30/0953
 2008/0027607 A1     1/2008   Ertl et al.
 2014/0063255 A1     3/2014   Breed
 2017/0080952 A1 *   3/2017   Gupta ................. B60K 35/00

FOREIGN PATENT DOCUMENTS

| DE | 102009045476 A1 | 4/2011 |
|----|-----------------|--------|
| EP | 2837538 A1 | 2/2015 |
| JP | 2008065481 A | 3/2008 |
| RU | 2008140643 A | 4/2010 |

* cited by examiner

VEHICLE SAFETY SYSTEM

CROSS-REFERENCE TO RELATED APPLICATIONS

This application claims priority to Great Britain Patent Application No. 1517752.0 filed 7 Oct. 2015, the disclosures of which are incorporated herein by reference in entirety.

BACKGROUND OF THE INVENTION

This invention relates to improvements in vehicle safety systems, in particular systems that may assist a driver in controlling a vehicle or that may be used as part of the control system for an autonomous vehicle.

It is known to provide various safety systems for vehicles, both passive safety systems and active safety systems. Indeed, recognizing that such systems can help reduce the number of fatalities on the road they are often mandatory equipment on new vehicles as many countries have legislation requiring the vehicles to be provided with those features.

Example of passive safety features for vehicles are seatbelts, airbags, pedestrian impact crumble areas and the like. The intention of these features is to protect the occupants of the vehicle, or pedestrians, from harm if an accident occurs. These features have been fitted to vehicle for a number of years now.

Active safety features, on the other, are capable of modifying the behavior of the vehicle alongside, or independently of the driver, in order to try to avoid an accident from happening. The increased use of electronic systems on the vehicle to control the steering, brakes and accelerator have made it possible for safety systems to control the movement of the vehicle. When combined with sensors fitted to the vehicle it is possible for a controller on the vehicle to determine that an accident is imminent and take some action.

An example of an active safety system that is fitted to a range of vehicles at present is automatic braking, in which the brakes are applied independent of the action of the driver if a controller fitted to the vehicle determines that a collision is likely. The controller may receive inputs from a range of sensors, including vehicle speed sensors and radar sensors that detect objects in the vehicles path. Another example of an active safety system is lane assist, in which the controller can adjust the steering of the vehicle independent of the driver so as to keep the vehicle within a lane of the highway.

Taking the idea of active system yet further are proposals for driverless (sometimes referred to as autonomous) vehicles which may perform some or all of the functions of the driver including steering, braking, accelerating and navigating the vehicle. The present invention is applicable to vehicles that are driven and also to fully or partially driverless vehicles

BRIEF SUMMARY OF THE INVENTION

A feature of the present invention is to provide an active safety system for a vehicle that provides an improved level of safety compared with existing systems under a range of driving conditions.

According to a first aspect the invention provides a safety system for a vehicle comprising:

a sensing means which is arranged to determine the presence of a preceding vehicle and, where present, to produce at least one first output signal representative of one or more characteristics of the preceding vehicle, the sensing means also being arranged to determine the presence of an oncoming vehicle and, where present, to produce at least one second output signal representative of one or more characteristics of the oncoming vehicle, a controller which is arranged to receive the output signals from the sensing means, and from the signals to generate a result signal indicative that it is possible for the vehicle to safely overtake the preceding vehicle before the oncoming vehicle blocks the path along which the vehicle must travel to complete the overtaking maneuver.

The one or more characteristics of the preceding vehicle that are represented by the one or more first output signals may include the distance from the vehicle to the preceding vehicle, the speed of the preceding vehicle, the direction of travel of the preceding vehicle and the rate of acceleration of the preceding vehicle. A first output signal may be generated for each characteristic.

The one or more characteristics of the oncoming vehicle that are represented by the one or more second output signals may include the distance from the vehicle to the oncoming vehicle, the speed of the oncoming vehicle, the direction of travel of the oncoming vehicle and the rate of acceleration of the oncoming vehicle. A second output signal may be generated for each characteristic.

The sensing means may a single sensor or multiple sensors. It may comprise a radar detector apparatus, which may view a scene in front of the vehicle as the vehicle is travelling in a forward direction along a highway. The detector may be fitted behind the grill of the vehicle, or at the top of the windscreen. Any preceding vehicle will be captured in the image seen by the radar detector apparatus. Determining distance, range and acceleration of object using a radar detector apparatus is established knowledge that the skilled man would have available and as such further detailed explanation will not be provided here.

In addition, or alternatively, the sensing means may comprise an optical camera detector apparatus that identifies objects in the scene and from changes in the appearance of the object over time determines the range and movement of the objects. For instance, if the preceding vehicle is moving away from the vehicle it will become smaller in subsequent images captured by the camera.

The detector apparatus may be located at the front of the vehicle but offset from the centre line of the vehicle in a direction towards the driver side of the vehicle. This allows the detector apparatus to get a better image of the scene around the side of the preceding vehicle, where an oncoming vehicle may be present in the captured image/radar reflection.

To enable a left hand drive vehicle to be driven in a country where the vehicles drive on the left hand side of the road, the sensor means may include a second detector apparatus located towards the other side (the passenger side) of the vehicle.

The or each detector apparatus may be located close to the side of the vehicle to optimize the view around the side of the preceding vehicle, by which we mean closer to the side of the vehicle than the centre line of the vehicle. They may each be located at the corner of the vehicle. They could, perhaps, be mounted to a wing mirror of the vehicle, or by the headlights.

Where there are two detector apparatus, the system may process the images/reflections captured by both apparatus to identify whether a preceding vehicle and an oncoming vehicle are present. It may be sufficient for an oncoming vehicle to only be visible to one detector apparatus, as would be the case if the view was blocked by the preceding vehicle.

The controller may be further arranged to receive vehicle information about the vehicle to which the safety system is assigned and to combine this information with the first and second output signals in generating the result signal. The controller may therefore use this vehicle information as a factor when determining if a safe overtake is possible.

The vehicle information may be static information stored in a memory that is accessed by the controller as the means of receiving the information. This static information may include the power of the vehicle drivetrain, the top speed of the vehicle, the weight of the vehicle, the acceleration of the vehicle under maximum power and torque, the instantaneous acceleration available at the present instant in time taking account of the engine load, gear etc.

The vehicle information may include dynamic information from one or more sensors, such as the speed of the vehicle and the acceleration of the vehicle.

The controller may determine if it is safe to overtake by generating from the output signals and optionally the vehicle information a target line representing a distal most boundary of a zone within which the vehicle will move back into lane after completing the overtake, and determine whether the oncoming vehicle will have crossed the target line before the overtake could be completed.

The controller may also determine if the target line is set to safe distance in front of the vehicle that is to be overtaken at the predicted end of the overtake maneuver, e.g. as the vehicle has pulled back into the lane in front of the vehicle being overtaken. This safe distance, defining a buffer zone, may be of fixed value such as 5 m or 6 m, or a distance dependent on the known length of the vehicle to which the system is fitted. If the target line is not at least the safe distance beyond the vehicle that is being overtaken then the controller may determine that it is not safe to overtake as there would not be room to safely complete the overtake.

The controller may additional receive information indicative of the speed limit of the road along which the vehicle is travelling. This may include information about the speed limit at all points between the vehicles current position and the position of the oncoming vehicle. This allows changes in speed limit, such as a sudden reduction in speed limit along the road, to be taken into account by the controller.

In determining the position of the target line the controller may use a model of the vehicle movement that includes an assumption that the vehicle does not exceed the speed limit for the road at any time during the overtaking.

The controller may also take account of information indicative of environmental factors when determining whether it is safe to overtake.

The controller may additionally take into account the RP (road profile) which may be transformed via the controller into a schematic map of the incoming road sector. This may include information on any incline or decline in the road that would affect the overtaking distance needed.

The system may also generate a measurement of size of the vehicle to be overtaken.

The controller may receive information from one or more transmitters located remotely from the vehicle. This may include a signal from one or more global positioning satellites which may be used by the vehicle to determine the vehicle position. This may also include information about speed limits along the road, and the weather and other factors as set out in the preceding paragraph.

The signals received remote from the vehicle may include information about the movement of the preceding vehicle and/or the oncoming vehicle that has been transmitted from the preceding vehicle and/or the oncoming vehicle. These signals may be received directly from those vehicles or indirectly, for instance by connection to a wireless network that is transmitting the signals.

The controller of the safety system may be adapted to receive a position signal from a global positioning unit fitted to the vehicle, or the system may include an integral global positioning unit.

In use the system may determine if it is safe to overtake by calculating a number of conditions, each represented by a function, and each formed using a combination of two or more of the signals input to the controller. The system may determine if it is safe to overtake only if each condition is met.

Example conditions include the required safe distance/zone in front of the preceding vehicle being present, as represented by the distance from the front of the preceding vehicle to the area in which the vehicle will pull in after the overtake, the target range of the oncoming vehicle at the end of the overtake, the time required to complete the overtake being below a threshold (it may take a long time if the preceding vehicle is travelling at close to the speed limit and the speed limit is not to be exceeded).

The system may calculate a number of different conditions, and the ones calculated may vary dependent on a number of scenarios. For example, there may be different conditions calculated for two scenarios —Scenario a and Scenario b—(where V1 is the vehicle speed, V2 the preceding vehicle speed and V3 the oncoming vehicle speed:

$$V1/V2/V3 = \text{constant, where } V1 > V2 \qquad \text{a)}$$

$$V1 = V1' + a1*t/V2 = V2' + a2*t/V3 = \text{constant} \qquad \text{b)}$$

where V1 is the vehicle speed, V2 the preceding vehicle speed and V3 the oncoming vehicle speed.

For scenario a the controller may be adapted to perform any and preferably all of the following calculations:

$$D0 \text{ (overtaking distance)} = L2 + SZ$$

$$t0 \text{ (time required to make the overtaking)} = D0/((V1-V2)*1000/3600) \ s$$

$$t \text{ (time for the overtaking } vh \text{ to meet the incoming one)} = (D-c\%*D)/((V1+V3)*1000/3600) \ s$$

c %—is a safety percentage taken from the detected distance between the oncoming vh and the one making the overtaking. The purpose of this coefficient is to create a safe zone in front of the incoming vh also. The recommended value is of 10% but it can be adjusted in reference with the detected distance.

$$Di, i=1\ldots 3 \text{ (distance travelled by each vehicle in the overtaking period)} = t0*Vi*1000/3600 \ (m)$$

$$Dr \text{ (the remaining distance in reference to the incoming vehicle)} = D - c\%*D - D1 - D3 \ (m),$$
where D1 is the distance travelled by the overtaking vh and D3 the one of the incoming vh.

For the b) variant the controller may be adapted to perform any, and most preferably all, of the following calculations:

$$D0 = L2 + SZ$$

$$a1*t^2 + (V1' - V2')*t - D0 = 0 \ (2^{nd} \text{ degree equation})$$

$$\Delta = (V1' - V2')^2 + 4*a1*D0$$

$t0$ (overtaking time)=$(-(V1'-V2')+\text{sqrt}(\Delta))/(2*a1)$ (s)

$(a1+a3)*t^2+(V1'+V3')-(D-c\%*D)=0$ $\Delta=(V1'+V3')^2+4*(a1+a3)*(D-c\%*D)$ $t$ (time for the overtaking $vh$ to meet the incoming one)=$(-(V1'+V3')+\text{sqrt}(\Delta))/(2*(a1+a3))$ (s)

$Di$, $i=1 \ldots 3$ (distance travelled by each vehicle in $t0$)=$t0*Vi*1000/3600+ai*t0^2$, where $a2=0$ m/s^2.

$Dr$ (the remaining distance in reference to the incoming vehicle)=$D-c\%*D-D1-D3$ (m), where $D1$ is the distance travelled by the overtaking $vh$ and $D3$ the one of the incoming $vh$.

Having performed the calculations the controller may check that all of the conditions are met and only if this is the case will the controller produce a result signal that indicates that the overtaking process to be made safely.

For instance, if the safe zone is present and the overtaking time is less than the meeting time with the incoming vehicle and the remaining distance between the overtaking vehicle and the incoming one is greater than 0 m, then it is safe to overtake.

The safety system may be permanently active as the vehicle is in motion, or may be provided with means for deactivating the system. For instance, a user operable switch may be fitted to the vehicle to enable the driver to deactivate the system. Where it is safe to do so, for instance if the vehicle is being used on a race track, it may be preferable to deactivate the system.

The safety system may be fitted to a vehicle that is operated by a driver, or a semi-autonomous vehicle that is only partially operated by a driver, or to a fully autonomous vehicle. A vehicle may operate in different modes—driven or autonomous, and the system may be fitted and active in either mode or both modes.

The system, having determined that it is safe to overtake may output a result signal indicating that an overtake is possible or not possible.

The system may in turn use the result signal to control an audible, visible or haptic alert to the driver, to warn the driver if it is safe or unsafe to overtake.

The controller may receive an indicator signal from the vehicle indicative that the driver has operated the indicator of the vehicle. Where an indicator signal is received, the warning signal may not be issued if the driver has not indicated, since it may be assumed that the driver is not intending to overtake and would not want to be distracted by the warning signal.

The system may override the driver if it determines that an overtake is not possible, perhaps keeping the driver in line behind the preceding vehicle by overriding the drivers movement of the steering wheel or throttle.

Where the vehicle is an autonomous vehicle, the vehicle may act on the result signal when planning an overtake maneuver and if the result indicates that it is safe to overtake the system may perform an overtake maneuver.

The system may be provided remote of the vehicle and may provide information to the vehicle over a wireless link. This may allow, for instance, the use of increased processing power off the vehicle with the outcome—a signal indicating if it is safe to overtake or not, being sent to the vehicle. This would require a stream of information, including the first output and second output signals to be transmitted wirelessly to the remote safety system.

According to a second aspect the invention provides a vehicle fitted with the safety system of the first aspect of the invention.

According to a third aspect the invention provides a control system for a vehicle which incorporates a safety system according to the first aspect of the invention, the control system controlling the operation of the vehicle in response to a result signal output from the safety system.

The control system and safety system may be implemented as a computer program installed and operating on a processor fitted to the vehicle. The processor may wholly or partially control the acceleration, braking and steering of the vehicle.

Other advantages of this invention will become apparent to those skilled in the art from the following detailed description of the preferred embodiments, when read in light of the accompanying drawings.

DETAILED DESCRIPTION OF THE INVENTION

Figure 1:
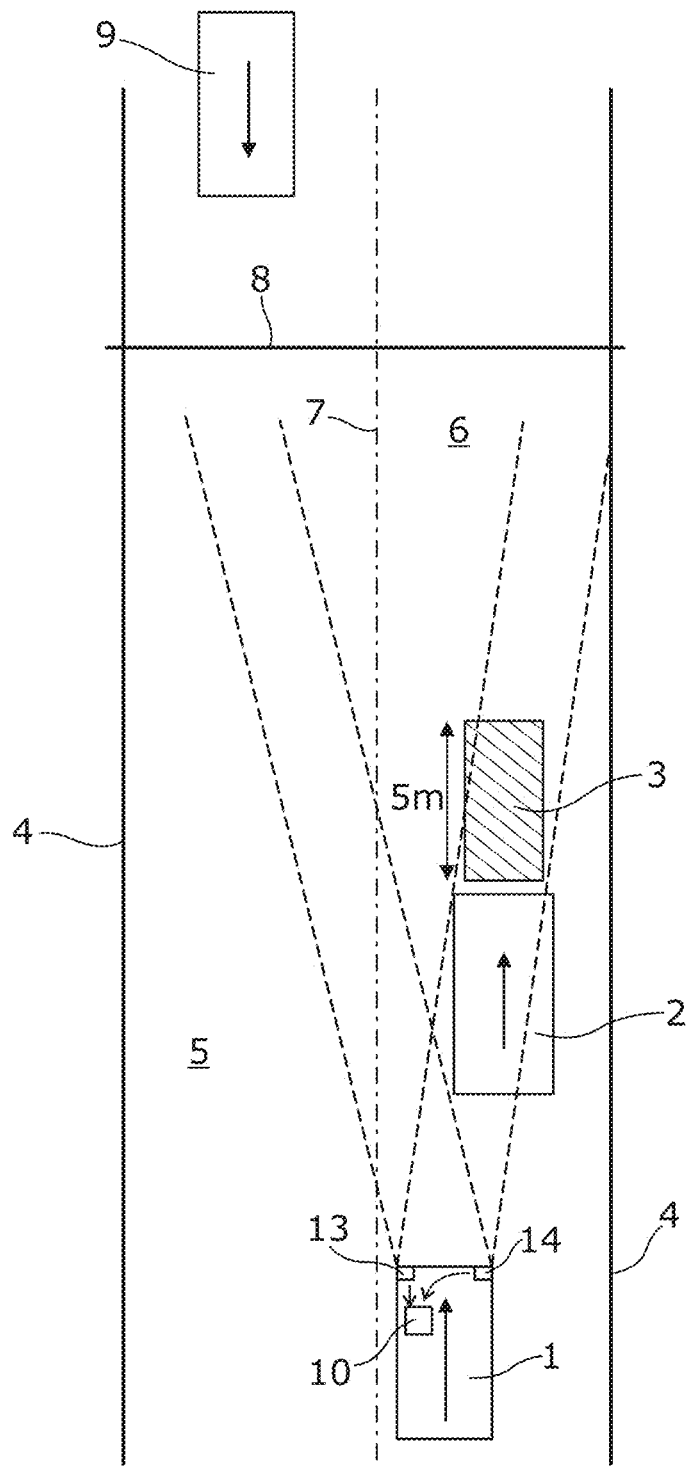
FIG. 1 is an illustration of a vehicle fitted with a first embodiment of a safety system according to the present invention.

FIG. 1 shows a host vehicle 1 fitted with a first embodiment of a safety system according to the present invention travelling along a two lane highway, the left and right boundaries of the highway being represented by lines 4. The direction of travel of the vehicle 1 is upwards relative to the page, in the direction of the bold arrow marked on the vehicle. The vehicle 1 is travelling along the right hand lane 6, as is usual in continental Europe and the USA, with oncoming traffic travelling in the left hand lane 5 and moving downward from the top of the page. As shown the lane is divided by a broken line 7, noting that it is a region of the highway on which it is legal for the vehicle to cross into the left hand lane to overtake, provided it is safe to do so.

Also shown in FIG. 1 are two other vehicles. One vehicle, referred to here as a preceding vehicle 2, is travelling in the right hand lane 6 in front of the host vehicle 1 and another, an oncoming vehicle 9, is travelling towards the host vehicle in the left hand lane 5.

Figure 6:
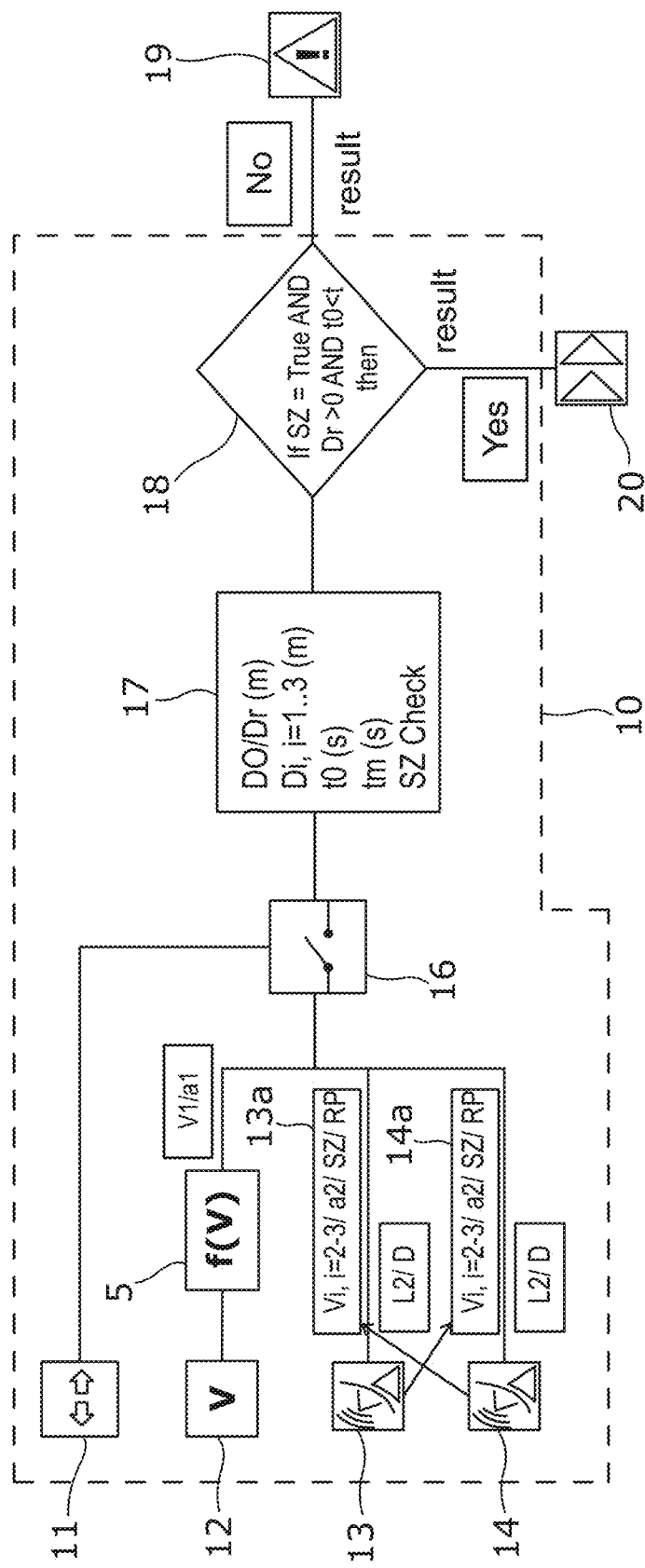
FIG. 6 is a schematic of the safety system of the first embodiment showing the signals input to the controller and the results signal that is produced.

The host vehicle 1 is fitted with a safety system as shown schematically in FIG. 6 of the drawings. The heart of the safety system is a controller 10, or ECU, that is represented in the schematic by a dashed line. This will be fitted to the vehicle and is powered from the vehicle battery (not shown) and connected to the communication bus of the vehicle to enable the controller to communicate with various sensors and actuators fitted to the vehicle including the throttle, brake and steering system.

The controller 10 is arranged to receive output signals and other vehicle information from several sources, and from these signals to generate a control signal indicative that it is possible for the vehicle to safely overtake the preceding vehicle before oncoming vehicle blocks the path along which the vehicle must travel to complete the overtaking maneuver.

The signals that are fed into the controller include:

An indicator signal 11, that is generated when a turn indicator is operated by the driver when they intend to overtake, or may be operated automatically as the vehicle approaches or starts to cross the dashed line marking the centre of the highway;

A speedometer signal 12 representing the velocity V of the vehicle;

A sensing means, in this example two radar based detection apparatus 13, 14 that each determines the presence of objects ahead of the vehicle. Each one is fitted to the front of the vehicle, perhaps behind sections of grill at the front bumper of the vehicle, with one close to the corner of the vehicle closest the driver and the other to the corner at the passenger side of the vehicle. Placing them at or close to the edges allows them a view around any preceding vehicle to spot oncoming vehicles. Each will record the speeds and acceleration of the oncoming vehicle 9 vh and of the preceding vehicle 2 vh, the distance to the oncoming vehicle (D), the SZ (safe zone) area 3, which is considered to be a 5 m free zone in front of the preceding vehicle and also the RP (road profile) which will be transformed via the software into a schematic map of the incoming road sector. A measurement of size of the vehicle to be overtaken will also be provided by the unit (L2). The 5 m setting can be varied, for instance as a function of vehicle speed.

An acceleration signal 15 derived from the vehicle speed signal 12.

The sensor means 13, 14 is configured to determine the presence of the preceding vehicle 2 and, where present, to produce at least one first output signal 13a representative of one or more characteristics of the preceding vehicle, and also to determine the presence of an oncoming vehicle 9 and, where present, to produce one or more further output signals 14a representative of one or more characteristics of the oncoming vehicle. This allows the system to detect the speed and distance of the preceding vehicle and oncoming vehicles and optionally also road mapping.

These signals are fed to the ECU. A driver operable switch 16 allows the signals to be cut-off, effectively disabling the safety system if desired. In an alternative, the safety system may be permanently active when the vehicle is in motion by omitting the switch 16 as shown in FIG. 2 that allows the driver to turn the system on or off as required.

Figure 2:
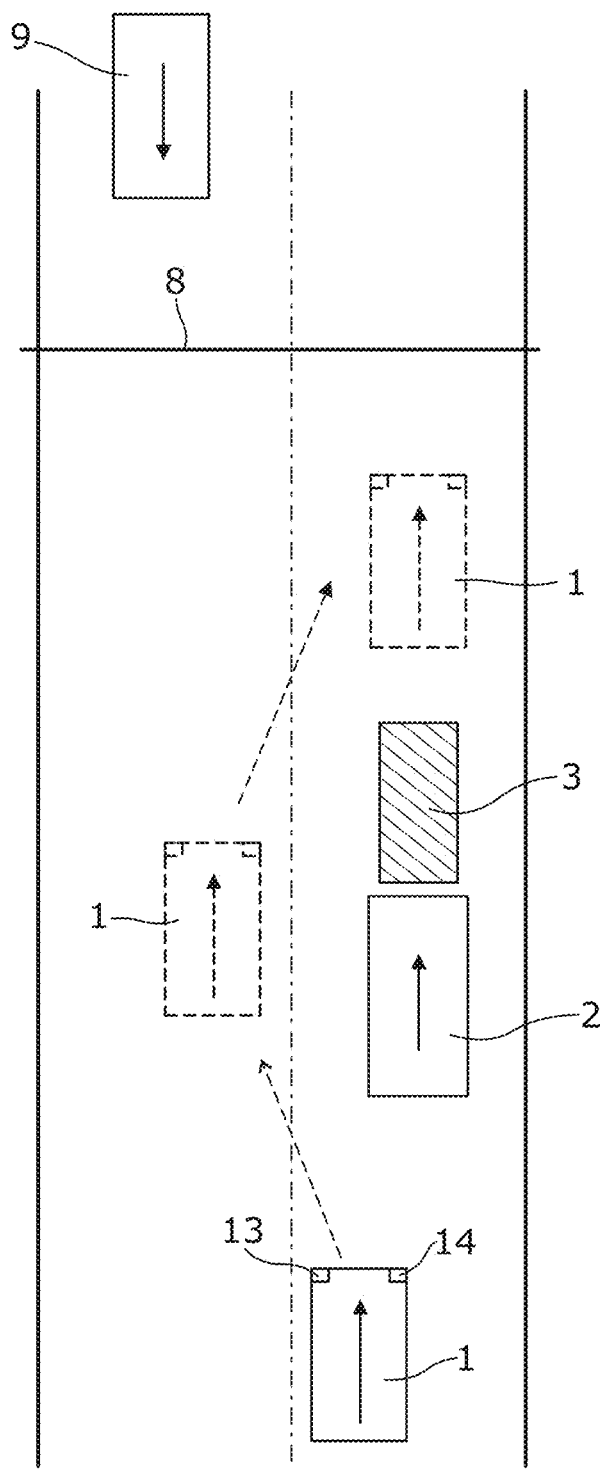
FIG. 2 is an illustration corresponding to FIG. 1 showing the movement of the vehicle during an overtake of a preceding vehicle.

The ECU is responsible for making the required calculations for establishing if the overtaking procedure is possible or not and this is represented in FIG. 2 by block 17.
Taken into consideration are the following scenarios:

$$V1/V2/V3 = \text{constant, where } V1 > V2 \quad \text{a)}$$

$$V1 = V1' + a1*t/V2 = V2' + a2*t/V3 = \text{constant} \quad \text{b)}$$

For the a) variant the following calculations will be made:

$$D0 \text{ (overtaking distance)} = L2 + SZ$$

$$t0 \text{ (time required to make the overtaking)} = D0/((V1-V2)*1000/3600) \; s$$

$$t \text{ (time for the overtaking } vh \text{ to meet the incoming one)} = (D - c\%*D)/((V1+V3)*1000/3600) \; s$$

c %—is a safety percentage taken from the detected distance between the oncoming vh and the one making the overtaking. The purpose of this coefficient is to create a safe zone in front of the incoming vh also. The recommended value is of 10% but it can be adjusted in reference with the detected distance.

$$Di, i=1 \ldots 3 \text{ (distance travelled by each vehicle in the overtaking period)} = t0*Vi*1000/3600 \; (m)$$

$$Dr \text{ (the remaining distance in reference to the incoming vehicle)} = D - c\%*D - D1 - D3 \; (m),$$
where D1 is the distance travelled by the overtaking vh and D3 the one of the incoming vh.

For the b) variant the following calculations will be made:

$$D0 = L2 + SZ$$

$$a1*t^2 + (V1' - V2')*t - D0 = 0 \; (2^{nd} \text{ degree equation})$$

$$\Delta = (V1' - V2')^2 + 4*a1*D0$$

$$t0 \text{ (overtaking time)} = (-(V1' - V2') + \sqrt{\Delta})/(2*a1)(s)$$

$$(a1 + a3)*t^2 + (V1' + V3') - (D - c\%*D) = 0$$

$$\Delta = (V1' + V3')^2 + 4*(a1 + a3)*(D - c\%*D)$$

$$t \text{ (time for the overtaking } vh \text{ to meet the incoming one)} = (-(V1' + V3') + \sqrt{\Delta})/(2*(a1 + a3)) \; (s)$$

$$Di, i=1 \ldots 3 \text{ (distance travelled by each vehicle in } t0) = t0*Vi*1000/3600 + ai*t0^2, \text{ where } a2 = 0 \; m/s^2.$$

$$Dr \text{ (the remaining distance in reference to the incoming vehicle)} = D - c\%*D - D1 - D3 \; (m),$$
where D1 is the distance travelled by the overtaking vh and D3 the one of the incoming vh.

In order for the controller to grant permission for the overtaking to take place, the system should fulfill a number of conditions with more or less complexity due to the type of system installment used. If one of the conditions is not being respected then the system will issue a warning in the first installment or act over the vehicle controls in the second installment in order to prevent the overtaking procedure.

In this first embodiment the controller will check that the safety area is present before allowing the overtaking to take place. The safe zone is used in order to allow the target vehicle to have a safe return within the direction of travel lane.

The controller will also take the calculated results from the travel equations (distance and time for the overtaking to take place and the time until the vehicle will meet the incoming one) and the distance towards the incoming vehicle from the radar detection units.

The conditions that need to be achieved in this stage are the following:

The overtaking distance should be inferior to the meeting distance of the target vh to the incoming vh.

The overtaking time should be less than the meeting time between the target vh and the incoming vh.

The controller includes a condition check unit 18, this will verify if all conditions are met in order for the overtaking process to be made safely. If the 5 m safe zone is present and the overtaking time is less than the meeting time with the incoming vehicle and the remaining distance between the overtaking vehicle and the incoming one is greater than 0 m, then a green light allowing the overtaking (20) can be shown to the driver, else a warning light will be shown (19).

FIG. 2 shows the motion of the vehicle 1 during an overtake that is safe. As can be seen the vehicle moves back in front of the oncoming vehicle (now a receding vehicle) in the safe zone 6 before the target line 8 has been reached by the oncoming vehicle 9.

Figure 3:
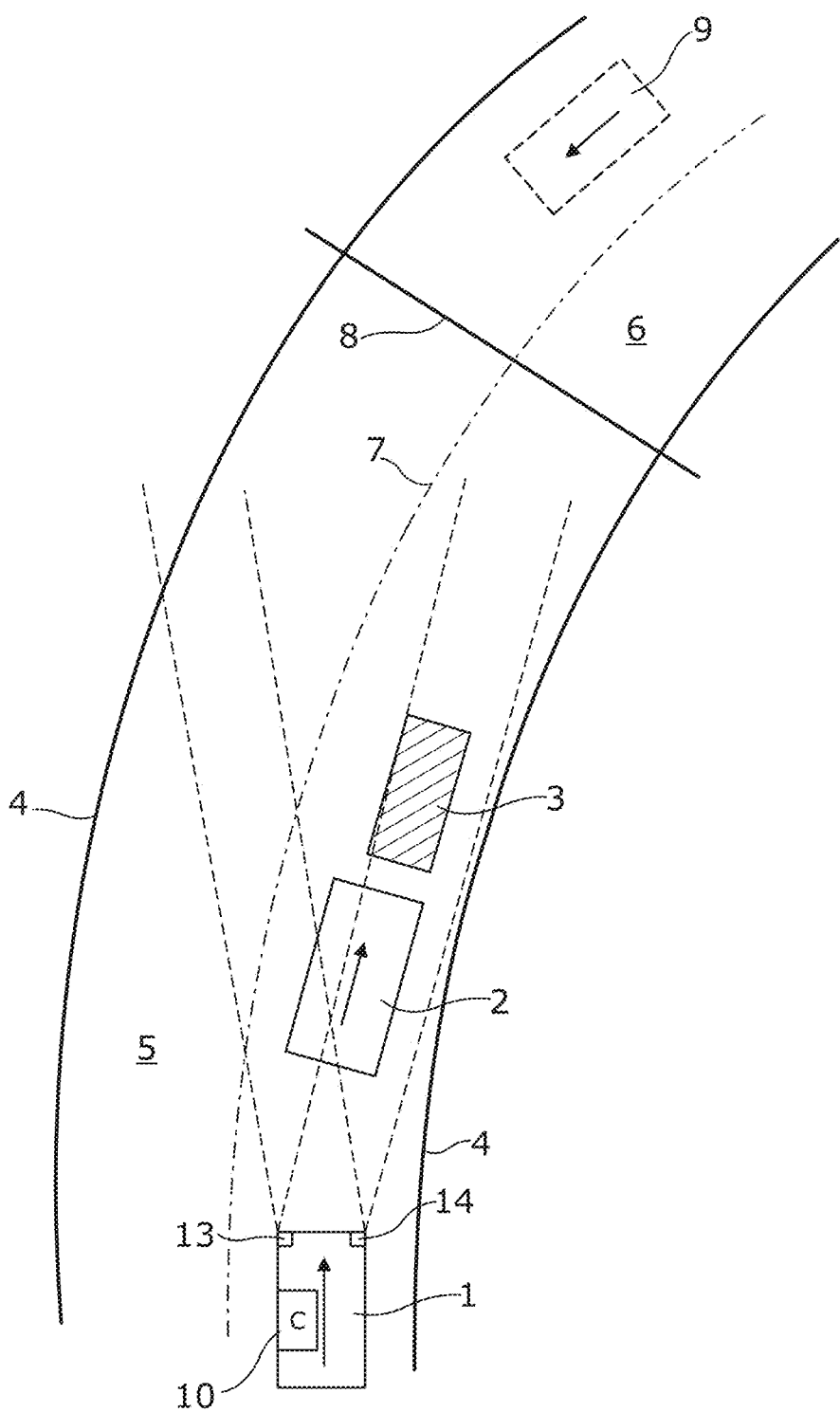
FIG. 3 is an illustration corresponding to FIGS. 1 and 2 where the vehicle is approaching a bend in the road.

FIG. 3 shows a similar overtake on a bend in the road. In this case, at the start of the overtake the oncoming vehicle cannot be seen due to the curve which may make the overtake unsafe. By noting the road is curving, using a GPS signal, a warning may be issued by the ECU.

Figure 7:
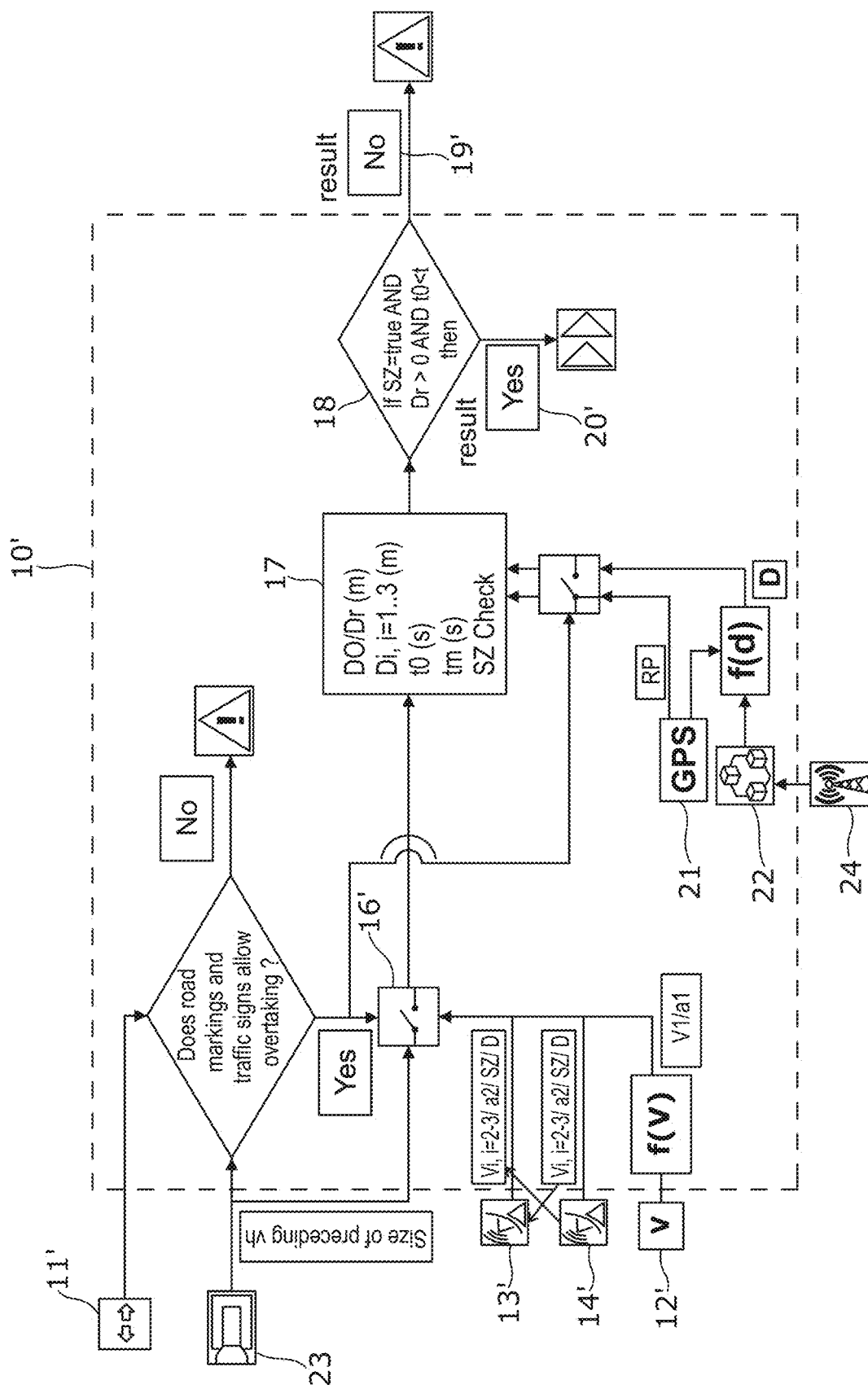
FIG. 7 is a similar schematic for the safety system of the second embodiment.

A second embodiment is shown in FIG. 7 which may further increase the functionality of the safety system by using additional information received from outside of the vehicle 1. This system includes all of the features of the first embodiment but the ECU 10' receives additional signals for additional sources, and performs some further processing using these signals.

The additional signals received and processed by the controller 10' in this second embodiment are supplied from the following:

A Forward facing camera 23 with traffic sign and road marking recognition capability. The output will be used for the condition point 16. Also the system will provide the size of the preceding vehicle (L2) by identifying the type of car.

An Onboard GPS unit 21, providing information about the road profile.

A vehicle's internet connection 22. This will allow the vehicle to connect to communication towers 24 in order to obtain information about the position of incoming traffic that would have the same connectivity capability.

The communication tower 24 that will transfer the position information of surrounding interconnected vehicles to the ECU via the internet connection 22.

Using these additional signals, the controller performs a further function calculating the distance between the current vehicle and the incoming one 9 (D) with the use of feedback from the imbedded GPS unit and information provided by the internet connection.

With the additional sensors of this second embodiment, system may check more conditions for the system to grant permission. These tests may be carried out by two control units, that form part of the control means, with different levels of complexity.

A first controller will take the information from the forward looking camera once the overtaking intent is being signaled and will issue a warning if the road markings or road signs don't allow an overtaking to take place. Also with the help of the forward looking camera or the water presence sensor we can take into account the weather conditions and in case of high precipitations (rain or snow) the system can issue a warning before going through the next control stage.

Once the $1^{st}$ condition is uphold, then the system should pass through all the calculations required in order to input data to the $2^{nd}$ control unit, which apart from the tests included in the $1^{st}$ system variant will have additional control loops as it follows:

If the vehicle is equipped with an internet connection and if through this connection it receives data that there is an incoming vh which is closer than the distance required for making the overtaking then it will issue a warning.

Also when taking into consideration the restrictions provided via the internet connection (speed limitations, road traffic restrictions—like incoming road works, a change in the road marking) and comparing to the overtaking conditions then the system can issue a warning if there is a high risk chance of missing the manoeuvre.

If the vehicle has an onboard GPS unit then by taking into account the different speed limitation that might occur on the sector of highway where the overtaking will take place and compared to the position and speed required to make the manoeuvre then the system can issue a warning if the required speed is greater than a calculated value that contains the speed limit on that sector+a constant (the constant is used in order to allow a small increase in the vh speed over the legal limit). Also by taking into account the changes in the road profile for the incoming sector (like tight turns, ramps, high ratio descents, etc.), the speed required to making the manoeuvre and the positions that the overtaking vh will hold during this action the system can trigger a warning if it judges that there is a risk in making that manoeuvre.

Also if the required speed for making that overtaking is well over the limit on that road sector the system should be able to issue a warning.

Apart from the auxiliary conditions, if the distance and time for making the overtaking is less than that of the 2 vehicles meeting and the required speed will not surpass the speed calculated by taking into account the legal limit and a constant, then the overtaking can take place in safe conditions.

Figure 4:
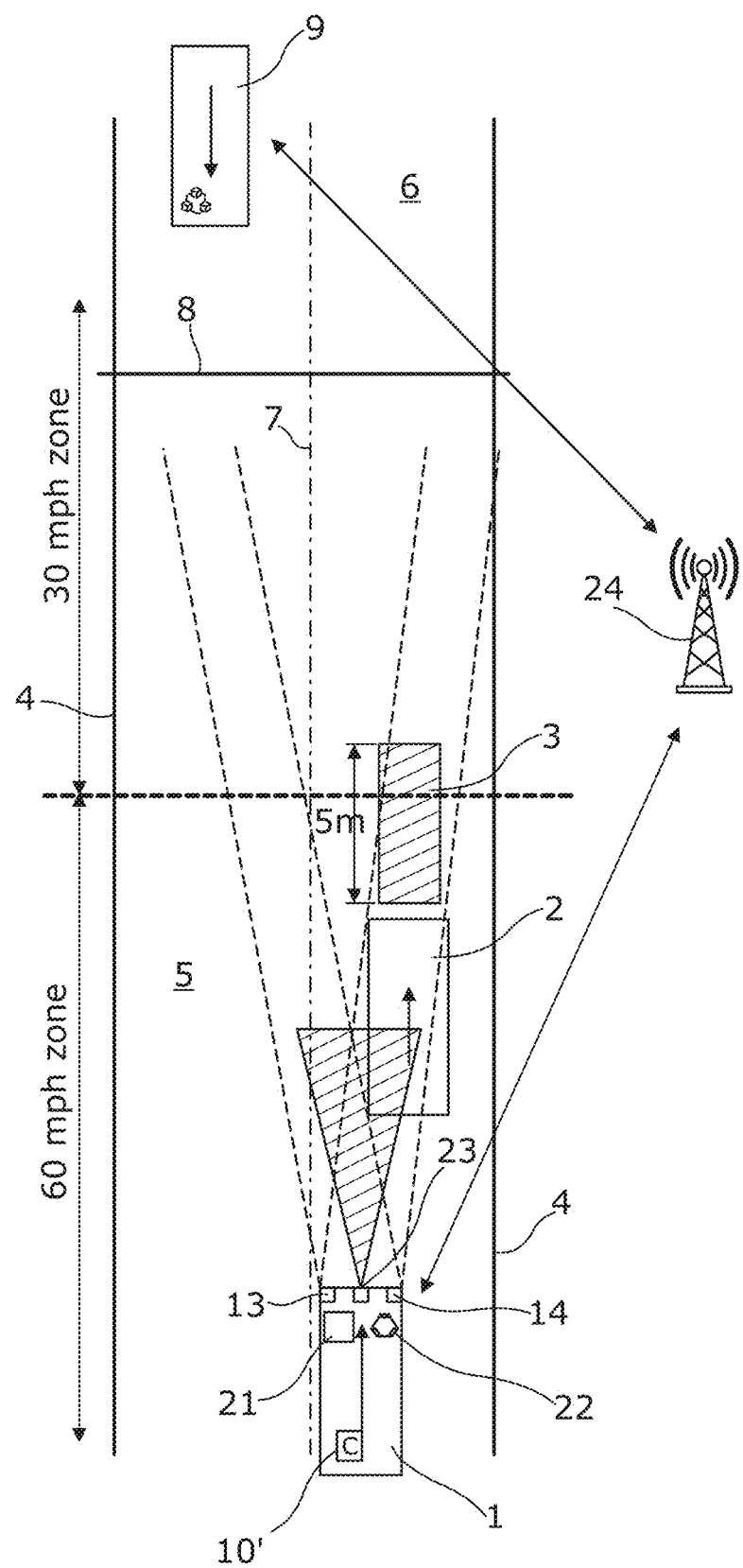
FIG. 4 is an illustration corresponding to FIG. 1 for a second embodiment of a safety system according to the present invention.
Figure 5:
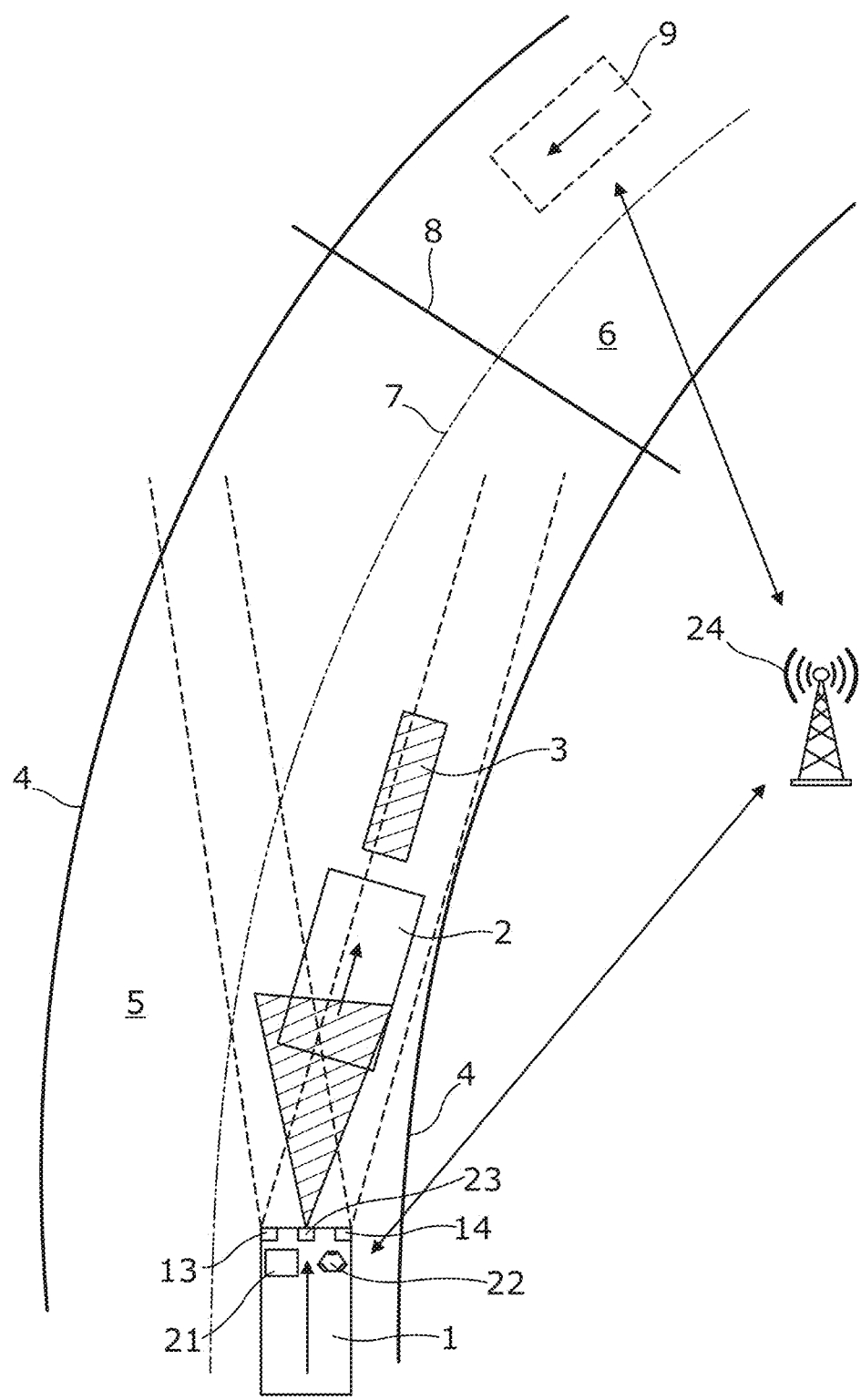
FIG. 5 is an illustration corresponding to FIG. 5 where the vehicle is approaching a bend in the road.

FIGS. 4 and 5 illustrate how the additional signals may be used beneficially in an overtake. As shown in FIG. 4, the speed limit of the road changes within the overtake zone and this may be detected by the camera. The speed limit will then be used in the calculation of the required overtaking distance and the target line position 8.

As shown in FIG. 5, even though the oncoming vehicle is not visible to the sensing means, the presence of the oncoming vehicle is made known to the controller via the signals sent from the coms tower. Additionally, the GPS signal is used to tell the vehicle that a corner is approaching and the target line is placed at the correct position around the curve. A safe overtake may be made if the oncoming vehicle is far enough away. Of course, this system depends on all vehicles being enabled for vehicle to vehicle communication, and until that is attained the system may simply flag that an overtake is unsafe when it is known that a vehicle is oncoming and at all other times leave the decision on the overtake at the discretion of the driver of the vehicle.

In each embodiment, the system may issue an alert to the driver such as a green light or warning signal. In an autonomous vehicle, when there is no driver, the system may supply the result signal to a control system for the vehicle drive which uses the result signal when planning the speed and direction at which the vehicle is being driven.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A safety system for a vehicle comprising:
    a sensing means which is arranged to determine a presence of a preceding vehicle and to produce at least one first output signal representative of one or more characteristics of the preceding vehicle, the sensing means also being arranged to determine the presence of an oncoming vehicle and to produce at least one second output signal representative of one or more characteristics of the oncoming vehicle, a controller which is arranged to receive the output signals from the sensing means, and from the output signals to generate a result signal indicative that it is possible for the vehicle to overtake the preceding vehicle before the oncoming vehicle blocks a path along which the vehicle must travel to overtake the preceding vehicle, in which the controller determines if it is possible to overtake the preceding vehicle by generating from the output signals a target line representing a distal most boundary of a zone within which the vehicle will move back into lane after the overtake of the preceding vehicle, the target line being a safe distance defined by a fixed value or a length of the vehicle to which the safety system is fitted, and determines whether the oncoming vehicle will have crossed the target line before the vehicle has completed the overtake of the preceding vehicle and also to determine if the target line is set to the safe distance in front of the preceding vehicle at a predicted end of the overtake of the preceding vehicle, wherein the safety system is configured to use the result signal to control an audible, visible or haptic alert to a driver of the vehicle, to warn the driver if it is possible or not possible to overtake.

2. The safety system for a vehicle according to claim 1 in which the one or more characteristics of the preceding vehicle that are represented by the at least one first output signal include a distance from the vehicle to the preceding vehicle, a speed of the preceding vehicle, a direction of travel of the preceding vehicle and a rate of acceleration of the preceding vehicle.

3. The safety system for a vehicle according to claim 1 in which the one or more characteristics of the oncoming vehicle that are represented by the at least one second output signal include a distance from the vehicle to the oncoming vehicle, a speed of the oncoming vehicle, a direction of travel of the oncoming vehicle and a rate of acceleration of the oncoming vehicle.

4. The safety system for a vehicle according to claim 1 in which the sensing means comprises a radar detector apparatus, which views a scene in front of the vehicle as the vehicle is travelling in a forward direction along a highway.

5. The safety system for a vehicle according to claim 4 in which the radar detector apparatus is located at a front of the vehicle but offset from a centre line of the vehicle in a direction towards a driver side of the vehicle.

6. The safety system for a vehicle according to a claim 1 in which the controller is further arranged to receive vehicle information about the vehicle to which the safety system is assigned and to combine this information with the first and second output signals in generating the result signal.

7. The safety system for a vehicle according to claim 1 in which the controller is configured to receive an indicator signal from the vehicle indicative the driver has operated an indicator of the vehicle.

8. The safety system for a vehicle according to claim 7, wherein the audible, visible or haptic alert is not issued if the indicator signal has not indicated that the driver has operated the indicator of the vehicle.

* * * * *